United States Patent [19]

Isozumi et al.

[11] Patent Number: 4,520,285
[45] Date of Patent: May 28, 1985

[54] STARTING MOTOR ASSEMBLY HAVING AN INTEGRAL EPICYCLIC GEAR

[75] Inventors: Shuzoo Isozumi; Kazuyoshi Hara, both of Himeji, Japan

[73] Assignee: Mitsubishi Denki Kabushiki Kaisha, Tokyo, Japan

[21] Appl. No.: 469,750

[22] Filed: Feb. 25, 1983

[30] Foreign Application Priority Data

Mar. 1, 1982 [JP] Japan .............................. 57-29806[U]

[51] Int. Cl.³ ............................................ H02K 7/116
[52] U.S. Cl. ........................................ 310/83; 74/801
[58] Field of Search ................. 310/83, 114, 115, 118; 74/7 A, 7 E, 802, 785, 801

[56] References Cited

U.S. PATENT DOCUMENTS

| | | | |
|---|---|---|---|
| 2,722,851 | 11/1955 | Steiner | 74/802 |
| 3,525,893 | 8/1970 | Neumann | 310/89 |
| 3,742,595 | 7/1973 | Lykes | 310/89 |

FOREIGN PATENT DOCUMENTS

| | | |
|---|---|---|
| 51526 | 5/1930 | France . |
| 2194064 | 2/1974 | France . |
| 2374525 | 2/1978 | France . |
| 467621 | 3/1944 | United Kingdom . |
| 651363 | 3/1951 | United Kingdom . |

Primary Examiner—William H. Beha, Jr.
Assistant Examiner—D. L. Rebsch
Attorney, Agent, or Firm—Oblon, Fisher, Spivak, McClelland & Maier

[57] ABSTRACT

A planet gear starter comprising a d.c. motor equipped with an epicycle reduction gear in which an internal gear is directly formed in the inner surface of a yoke of the d.c. motor.

7 Claims, 2 Drawing Figures

STARTING MOTOR ASSEMBLY HAVING AN INTEGRAL EPICYCLIC GEAR

The present invention relates to an improvement in a starting motor (a planet gear starter) equipped with an epicycle reduction gear.

Figure 1:
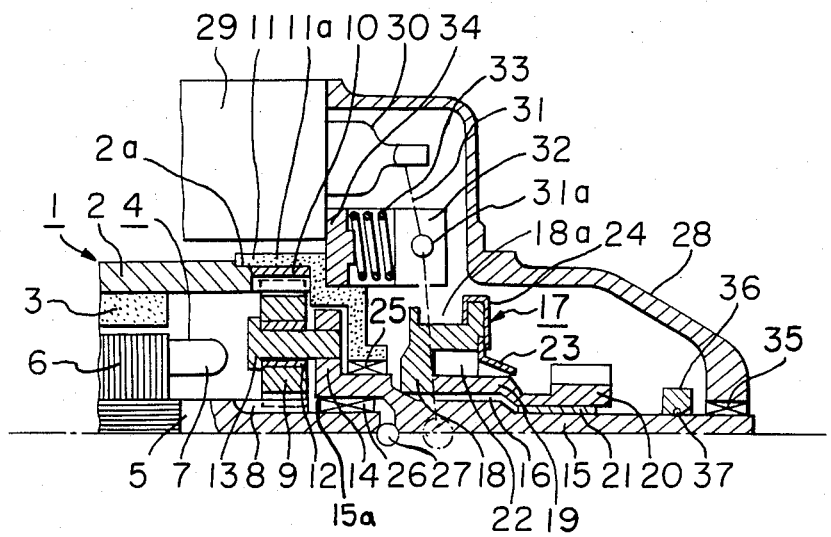

As a conventional device of this type, there has been proposed a device as shown in FIG. 1. In FIG. 1, the reference numeral (1) designates as a whole a d.c. motor. The yoke (2) of the d.c. motor (1) is formed by rounding a soft steel plate in a cylindrical shape. On the inner surface of the yoke (2), a plurality of poles (3) made of ferrite permanent magnetic substance are fixed. An armature (4) is so positioned as to face the poles (3) inside thereof and the armature (4) is constituted by an armature rotary shaft (5), an armature iron core (6) fitted to the armature rotary shaft and armature coils (7) fitted into slots formed in the armature iron core (6). At the front end of the armature rotary shaft (5), there is formed a spur gear (8), as the solar gear of an epicycle reduction gear, with which a planet gear is meshed. A ringed gear (internal gear) (10) is internally engaged with the planet gear (9) and the ringed gear is fitted into a ringed groove (11a) formed on the circular inner wall of an intermediate bracket (11) so as to be in contact with a circular seat portion (2a) formed at the end surface of the yoke (2).

A sleeve bearing (12) is fitted to the inner surface of the planet gear (9) and is pivotally supported by a supporting pin (13) so that the circular movement of the planet gear is transmitted through the supporting pin (13) to a flange (14) formed integral with the outer circumference of an output rotary shaft (15). A helical spline (16) is formed in the outer circumference of the rotary shaft. The clutch outer member (18) of an overrunning clutch (17) engages with the helical spline in a slidable manner so that rotational force is transmitted. The reference numeral (19) designates a clutch inner member having the front end on which a pinion (20) is secured. The clutch inner member (19) is turnably mounted on the output rotary shaft (15) through a sleeve bearing (21) fitted to the inner surface of the pinion (20). A plurality of rollers (22) are interposed between the clutch outer member (18) and the clutch inner member (19) to transmit rotational force of the former to the latter. A plate (23) is provided so as to cover a part of the clutch inner member. A cover plate (24) combines parts constituting a part of the overrunning clutch (17) as illustrated in the figure and is secured to the clutch outer member (18) by caulking. A sleeve bearing (25) is interposed between the inner circular surface of the intermediate bracket (11) and the bearing surface of the output rotary shaft (15). A separate sleeve bearing (26) is fitted to a groove (15a) formed in the inner circumference of the output rotary shaft (15) to pivotally support the front end of the armature rotary shaft (5). A steel ball (27) is interposed between the armature rotary shaft (5) and the output rotary shaft (15) to bear thrusting loads produced by both the rotary shafts. A front bracket (28) is placed to surround the output rotary shaft (15) and the members engaging it and has an opening, opened toward the d.c. motor, in which an electromagnetic switch (29) is positioned. The outermost cylindrical portion of the intermediate bracket (11) inside of which the ringed groove (11a) is formed, extends from the opening of the front bracket toward the d.c. motor (1) and the circular edge of the cylindrical portion is engaged with circular step portion formed at the outer end surface of the yoke (2). In the opening of the front bracket (28), a holder casing for holding a holder (32) is secured on a step formed at the shoulder portion of the intermediate bracket (11). A plunger (30) extends inwardly from the electromagnetic switch (29). A shift lever (31) is pivotally supported at its turntable fulcrum point (31a) by the holder (32) and has one end which is brought into cam-engagement with the plunger (30) and has the other end being in cam-engagement with the circumferential groove (18a) of the overrunning clutch (17). A lever spring (33) is held in the holder casing to urge the holder (32). The holder (32) has a base plate (34) providing a bearing seat for the lever spring (33), and the base plate (34) closes the gap of the opening formed by the electromagnetic switch (29) and the intermediate bracket (11). A sleeve bearing (35) is fitted to the inner surface of the front end of the front bracket (28) to bear the front end of the output rotary shaft (15).

The reference numeral (36) designates a stopper for restricting forward movement of the pinion (20) and (37) designates a ring for fixing the stopper to the output rotary shaft (15).

The operation of the conventional starting motor having the structure described above will be explained.

Upon actuation of the electromagnetic switch (29), the following operations are attainable: current is fed to the switch for actuating the same; the plunger (30) is attracted into the casing; the shift lever (31) is moved in the counterclockwise direction; the overrunning clutch (17) slides forwardly on the output rotary shaft (15) and the pinion (20) is brought into engagement with the ringed gear of an internal combusion engine (not shown). Then, the main contact (not shown) of the electromagnetic switch (29) is closed and the armature (4) of the d.c. motor (1) is fed with electric current to be energized thereby producing rotational force of the armature rotary shaft (5). The revolution speed of the armature rotary shaft (5) is reduced by the planetary movement of the planet gear (9) meshed with the spur gear (8) secured on the rotary shaft (5) so that the reduced revolutional speed is transmitted to the flange (14) through the supporting pin (13). The rotational force is transmitted to the internal combustion engine for starting in the order of the output rotary shaft (15)→helical spline (16)→clutch outer member (18)→roller (22)→clutch inner member (19)→pinion (20). During the operation, the ringed gear (10) is subjected to a reactive force because the planet gear (9) is meshed with the teeth formed inside the ringed gear. The reactive force is received by the clamping force of the yoke (2) and the intermediate bracket (11).

In the conventional starting motor having the structure described above, the ringed gear constituting an epicycle reduction gear has been separately prepared with the consequence that the entire mechanism of the starting motor has been complicated and expensive, as well as weighty.

It is an object of the present invention to overcome the disadvantage of the conventional starting motor and to provide a starting motor having a simple structure and high strength by forming a ringed gear in a yoke itself.

The foregoing and the other objects of the present nvention have been attained by providing a planet gear starter comprising a d.c. motor equipped with an epicycle reduction gear wherein an internal surface constituting said epicycle reduction gear is directly formed in the inner surface of the yoke of the d.c. motor.

The foregoing object and other objects, as well as specific construction and operations of the planet gear starter according to the present invention, will become more apparent and understandable from the following detailed description when read in conjunction with the accompanying drawing.

Figure 2:
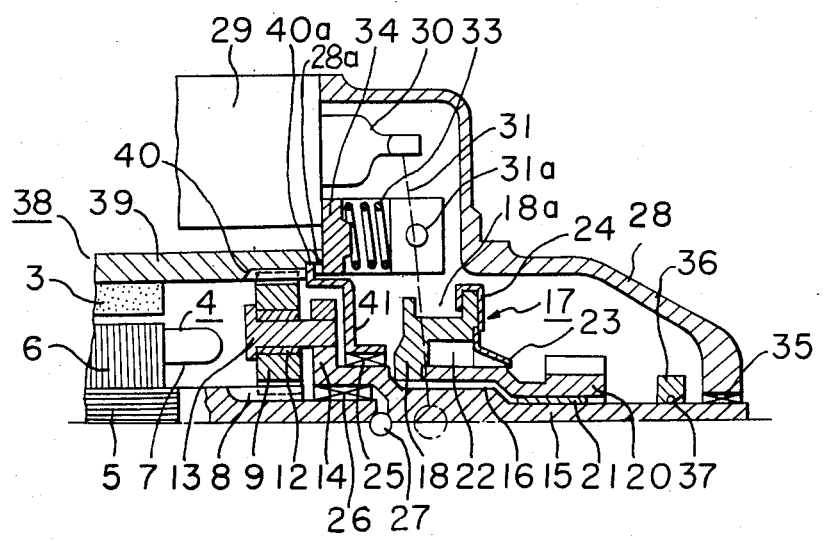

In the drawing:

FIG. 1 is a longitudinal cross section of the important part of the conventional starting motor; and FIG. 2 is a cross section, similar to FIG. 1, of an embodiment of the starting motor of the present invention.

In the following, the present invention will be explained in specific details with reference to a preferred embodiment of the planet gear starter according to the present invention as shown in the accompanying drawing. The same reference numerals designate the same or corresponding parts in the drawing.

In FIG. 2, the reference numeral (38) designates a d.c. motor in which a ringed gear (internal gear) (40) is directly formed in the inner surface of the yoke (39). A circular step portion (40a) is formed at the inner surface of the end portion of the yoke (39) in the vicinity of the internal gear (40). An intermediate bracket (41) is provided to support the rotary output shaft (15) through the sleeve bearing (25). The outermost portion of the intermediate bracket (41) is fitted into the circular step portion (40a) which cooperates with a flange (28a) of the front bracket (28) to clamp the outermost portion of the intermediate bracket (41). The other parts and elements are identical or corresponding to those of FIG. 1. Therefore, the descriptions of the parts and operation are omitted.

In accordance with the embodiment of the present invention, reactive force given to the ringed gear (40) with which the planet gear (9) is internally meshed, is received by the yoke (39) itself. The ringed gear formed inside the yoke provides a high strength construction of an epicycle reduction gear and also provides a starting motor having a simple structure as a whole. Further, size and weight of the intermediate bracket can be reduced because the outermost portion is fitted into the circular step portion, unlike the conventional device having an intermediate bracket covering a part of the outer surface of the yoke.

In the embodiment, the description has been made on a permanent magnet type d.c. motor (38). The same effect can be attained even with use of a field coil type device.

As described above, in accordance with the present invention, a starting motor of high strength, compact and light weight can be obtained with a simple structure by directly forming a ringed gear (internal gear) in the inner surface of the yoke of a d.c. motor.

We claim:

1. A starting motor assembly for an internal combustion engine, said starting motor assembly comprising:
   (a) a starting motor comprising a yoke surrounding an armature rotary shaft;
   (b) an output shaft which is coaxial with said armature rotary shaft; and
   (c) an epicyclic reduction gear assembly operatively connected to said starting motor, said epicyclic reduction gear assembly comprising a solar gear mounted on and rotatable with said armature rotary shaft, a planetary gear in engagement with said solar gear and operatively connected to said output shaft such that rotation of said planetary gear about said solar gear causes corresponding rotation of said output shaft, and an internal gear formed integrally in an inner circumferential surface of said yoke as a part of said yoke, said internal gear being in engagement with said planetary gear, whereby the rotational speed of said armature rotary shaft is stepped down by said epicyclic reduction gear assembly and said output shaft consequently rotates more slowly than said armature rotary shaft.

2. A starting motor assembly as recited in claim 1:
   (a) wherein a circular step portion is formed in the inner surface of the end portion of said yoke beyond said internal gear in the direction of said output shaft and
   (b) further comprising an intermediate bracket in which said output shaft is slidably and rotatably received, the radially outer surface of said intermediate bracket being fixedly received in said circular step portion.

3. A starting motor assembly as recited in claim 1 and further comprising an output gear mounted on said output shaft in position to operatively engage a gear on an internal combustion engine to transmit rotational force from said starting motor and said epicyclic reduction gear assembly to the internal combustion engine.

4. A starting motor assembly as recited in claim 1 wherein said planetary gear is mounted on said output shaft.

5. A starting motor assembly for an internal combustion engine, said starting motor assembly comprising:
   (a) a starting motor comprising a yoke surrounding an armature rotary shaft, a circular step portion being formed in the inner surface of the end portion of said yoke;
   (b) an output shaft which is coaxial with said armature rotary shaft;
   (c) an intermediate bracket in which said output shaft is slidably and rotatably received;
   (d) an epicyclic reduction gear assembly operatively connected to said starting motor, said epicyclic reduction gear assembly comprising a solar gear mounted on and rotatable with said armature rotary shaft, a planetary gear in engagement with said solar gear and operatively connected to said output shaft such that rotation of said planetary gear about said solar gear causes corresponding rotation of said output shaft, and an internal gear formed integrally in an inner circumferential surface of said yoke as a part of said yoke, said internal gear being in engagement with said planetary gear; and
   (e) a front bracket in which said output shaft is slidably and rotatably received at a point spaced from said intermediate bracket in a direction away from said epicyclic reduction gear assembly, said front bracket surrounding said epicyclic reduction gear assembly and said output shaft, and the radially outer surface of said intermediate bracket being clamped between the circular step portion on said yoke and said front bracket, whereby the rotational speed of said armature rotary shaft is stepped down by said epicyclic reduction gear assembly and said output shaft consequently rotates more slowly than said armature rotary shaft.

6. A starting motor assembly as recited in claim 5 and further comprising an output gear mounted on said output shaft in position to operatively engage a gear on an internal combustion engine to transmit rotational force from said starting motor and said epicyclic reduction gear assembly to the internal combustion engine.

7. A starting motor assembly as recited in claim 5 wherein said planetary gear is mounted on said output shaft.

* * * * *